United States Patent [19]
Dauvergne

[11] 4,214,642
[45] Jul. 29, 1980

[54] POWER-ASSISTED STEERING DEVICE
[75] Inventor: Jean L. R. Dauvergne, Fosses, France
[73] Assignee: Societe Anonyme Francaise du Ferodo, Paris, France
[21] Appl. No.: 877,769
[22] Filed: Feb. 14, 1978
[30] Foreign Application Priority Data
  Feb. 14, 1977 [FR] France ............... 77 04051
[51] Int. Cl.² ............................................. B62D 5/08
[52] U.S. Cl. .................... 180/132; 91/375 A; 403/272; 403/277; 74/388 PS
[58] Field of Search .......... 180/148, 146, 147, 132; 91/375 A; 267/154; 403/277, 282, 272, 271

[56] References Cited
U.S. PATENT DOCUMENTS

| | | | |
|---|---|---|---|
| 2,579,227 | 12/1951 | Edwards | 403/282 |
| 2,988,059 | 6/1961 | Wysong | 180/146 X |
| 3,296,940 | 1/1967 | Eddy et al. | 91/375 A |
| 3,735,832 | 5/1973 | Akima | 180/148 |

FOREIGN PATENT DOCUMENTS

| | | | |
|---|---|---|---|
| 2231554 | 12/1974 | France | 180/146 |
| 223300 | 10/1924 | United Kingdom | 403/272 |

Primary Examiner—John A. Pekar
Attorney, Agent, or Firm—Young & Thompson

[57] ABSTRACT

A power assisted steering mechanism comprises a steering column in two parts which are connected by a plain cylindrical torsion bar which may be solid or hollow and which allows a certain degree of relative angular displacement. An abutment is also provided to prevent excessive relative angular displacement resulting from failure of the torsion bar. The torsion bar has one of its ends bonded to one of the parts in any relative angular position and the other end is bonded to the other part as by welding, brazing or adhesive bonding, and a power assistance means are adapted device operates in response to relative movement of the parts resulting from a steering movement.

7 Claims, 10 Drawing Figures

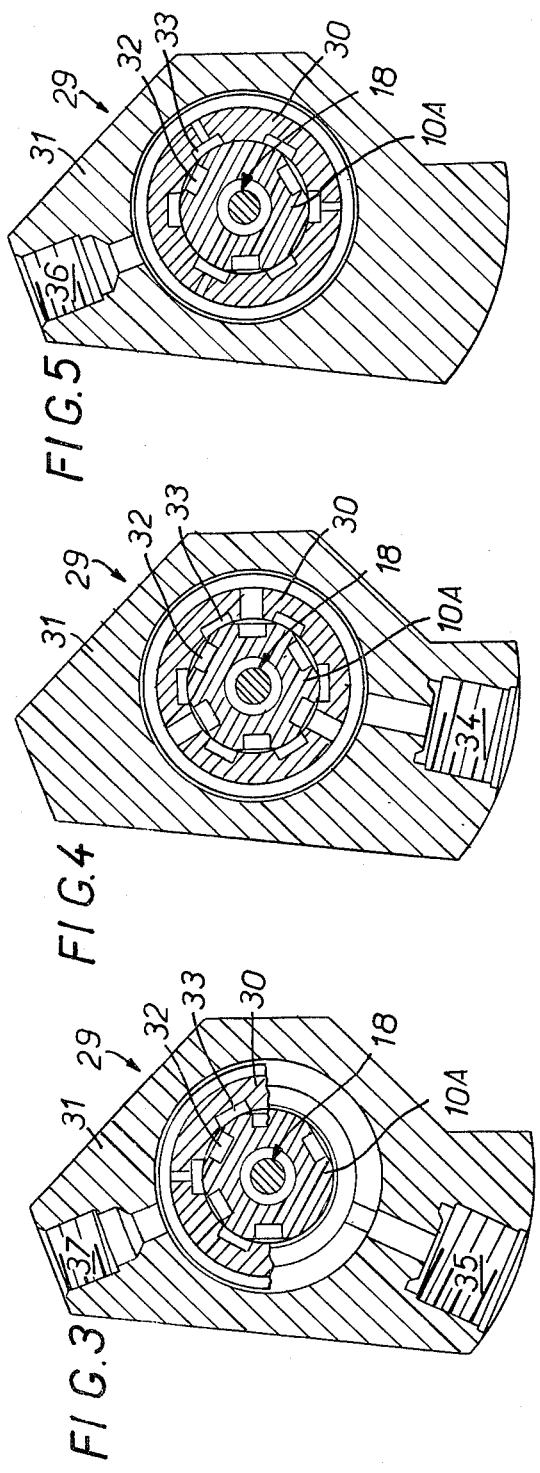

POWER-ASSISTED STEERING DEVICE

BACKGROUND OF THE INVENTION

The present invention relates to a power assisted steering device comprising a rotatable steering column composed of two aligned parts fastened respectively to a steering control means and to a steering operating means, the said parts having relative angular movability limited by abutment means and being connected together by a torsion bar, and further comprising power assistance means which come into action in response to an angular movement of the said parts in relation to one another and acting in the same direction as the operating means in order to reinforce the action of the latter.

The invention relates more particularly to a power assisted steering device of this kind for automobile vehicles in which the control means is a steering wheel, and the operating means is a pinion meshing with a rack. The latter controls the steered wheels of the vehicle with the aid of connecting rods. The assistance means comprise a hydraulic cylinder acting on the rack and fed from a central hydraulic system with the aid of a distribution means sensitive to the relative angular position of the two parts of the steering column.

As will be understood, the torsion bar connecting the two parts has the effect of returning these parts to and holding them in a relative angular position of rest. When the driver turns the steering wheel the torsion bar undergoes deformation and transmits the torque to the operating means, but at the same time the angular displacement of the two parts in relation to the position of rest frees a hydraulic flow which causes the cylinder to act on the rack.

The abutment means disposed between the two parts are intended to ensure safety in the event of mechanical failure, but do not intervene in normal operation. For example, the torsion bar suitably permits normal angular displacement of the two parts of the order of 1° in either direction, whereas the angular movability of the two parts between the two limit positions defined by the abutment means is of the order of 6°.

The torsion bar thereby constitutes an element which is essential to the sensitivity of control for the purpose of bringing the assistance means into operation, while safety is ensured by the abutment means.

Up to the present time, in known devices the different purposes served on the one hand by the torsion bar, that is to say sensitivity, and on the other hand by the abutment means, that is to say safety, had not generally been taken into account.

In such known devices, the torsion bar usually has a shape consisting of a rod provided with two end heads of larger diameter for the purpose of connection by pins to the two parts of the column.

An arrangement of this kind has numerous disadvantages. Firstly, through their very existence the presence of the heads entails a large diameter. Secondly, connection by pins is inconvenient if it is borne in mind that one of the heads must be fastened to one of the parts by drilling in situ with accurate angular control. Furthermore, the presence of these pins makes it necessary to take special precautions in relation to sealing.

The main object of the present invention is the provision of a power assisted steering device of the type indicated above, which is free from the disadvantages indicated and whose construction is simple and convenient.

SUMMARY

According to the present invention the torsion bar has its ends fastened to the two parts of the column on the one hand to one of them in any angular position and, on the other hand, to the other part, in a controlled angular position with the aid of bonding means.

The term "bonding means" is intended to cover fastening means such as welding, brazing, and adhesive bonding.

More particularly, in a preferred embodiment the bonding means comprises brazing with added material, achieved by heating with high frequency induction. In this case the torsion bar is first fastened to one of the parts in any relative angular position (which would not be possible by pinning), for example by a tight interference fit with or without interpenetration, by a wedge effect, or else by bonding such as welding, brazing, or adhesive bonding, or in any other manner. The other end of the torsion bar is then engaged in a bore in the other part. Brazing filling material is disposed at the entry of the gap formed between the said end and the bore, and the position of rest of the two parts in relation to one another is adjusted accurately. All that is then required is simply to lower an induction head to heat the filling material, which then penetrates into the gap, thus effecting the desired connection.

The arrangement according to the invention does not require the presence of heads of larger diameter at the ends of the bar, such as are required for pinning; according to another characteristic of the invention the torsion bar is cylindrical and has no heads of larger diameter.

This arrangement makes it possible to manufacture the torsion bar in an economical and reliable manner from cylindrical section tube.

In addition, there is a free choice of a metal possessing high elasticity and a free choice of the diameter in dependence on the torque to be transmitted, for example of the order of 10 newton/meters. Dimensions are reduced, thus making it possible to increase the sections of the members which have a safety function, particularly where the two parts of the column and the abutment means are concerned. To give an example, it is expedient that these members serving a safety function should effect the transmission of a torque of the order of 300 newton/meters.

Thus the arrangement according to the invention makes it possible in a suitably advantageous manner to reconcile the function of sensitivity required of the torsion bar (torque of about 10 newton/meters) and the safety function required of the two parts of the column and of the abutment means (torque of the order of 300 newton/meters). In addition, the assembly means, in the form of bonding means, makes it possible to avoid weakening the torsion bar by transverse drilling for pinning purposes.

Particularly because of the absence of connecting pins, the arrangement according to the invention makes it possible for the torsion bar to be hollow. In this case the torsion bar may advantageously be used as a duct for the circulation of fluid, particularly for the requirements of connection to a tank of the central hydraulic system.

BRIEF DESCRIPTION OF THE DRAWINGS

FIGS. 3, 4, 5 and 6 are views in cross-section on the lines III—III, IV—IV, V—V and VI—VI respectively;

FIGS. 7, 8 and 9 relate respectively to three alternatives for the fastening of the torsion bar on one of the parts of the column;

DESCRIPTION OF THE PREFERRED EMBODIMENTS

Figure 1:
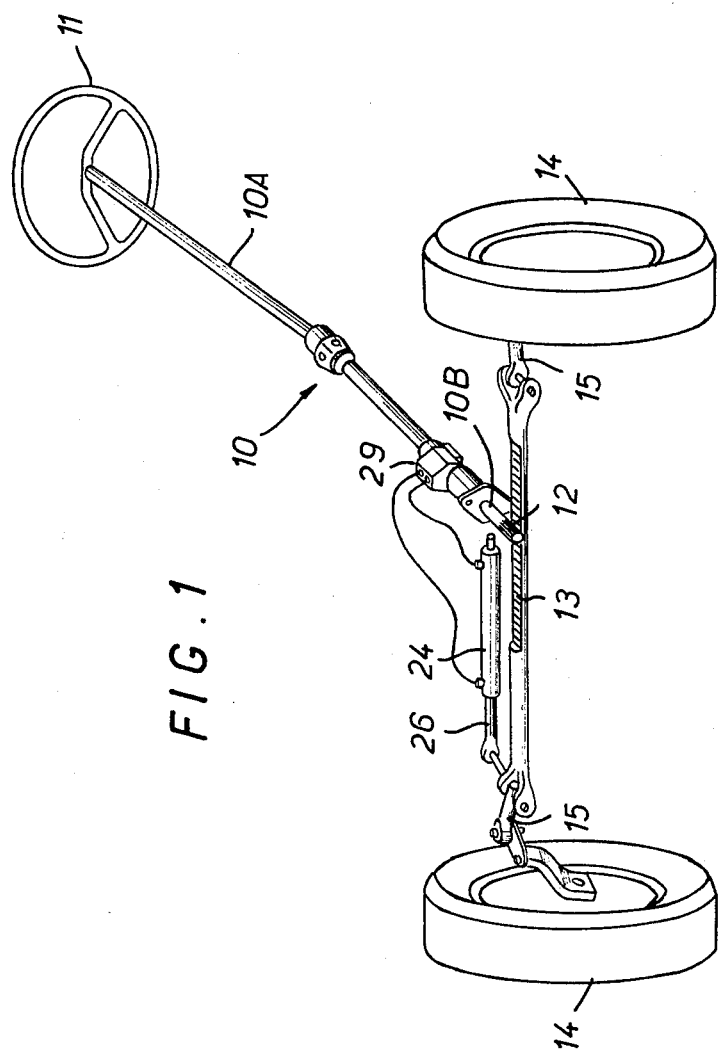
FIG. 1 is a diagrammatical view in perspective of an assisted steering device for an automobile vehicle, according to the invention.

In the embodiment shown in FIGS. 1 to 7, a power-assisted steering mechanism according to the invention is, by way of example, shown fitted to an automobile vehicle.

This device (FIG. 1) comprises a rotatable steering column 10 composed of two aligned parts 10A and 10B. The part 10A is fastened to a control means consisting of a steering wheel 11. The part 10B is fastened to an operating means consisting of a pinion 12 meshing with a rack 13. The latter controls the steering of the steered wheels 14 of the vehicle with the aid of connection rods 15.

Figure 2:
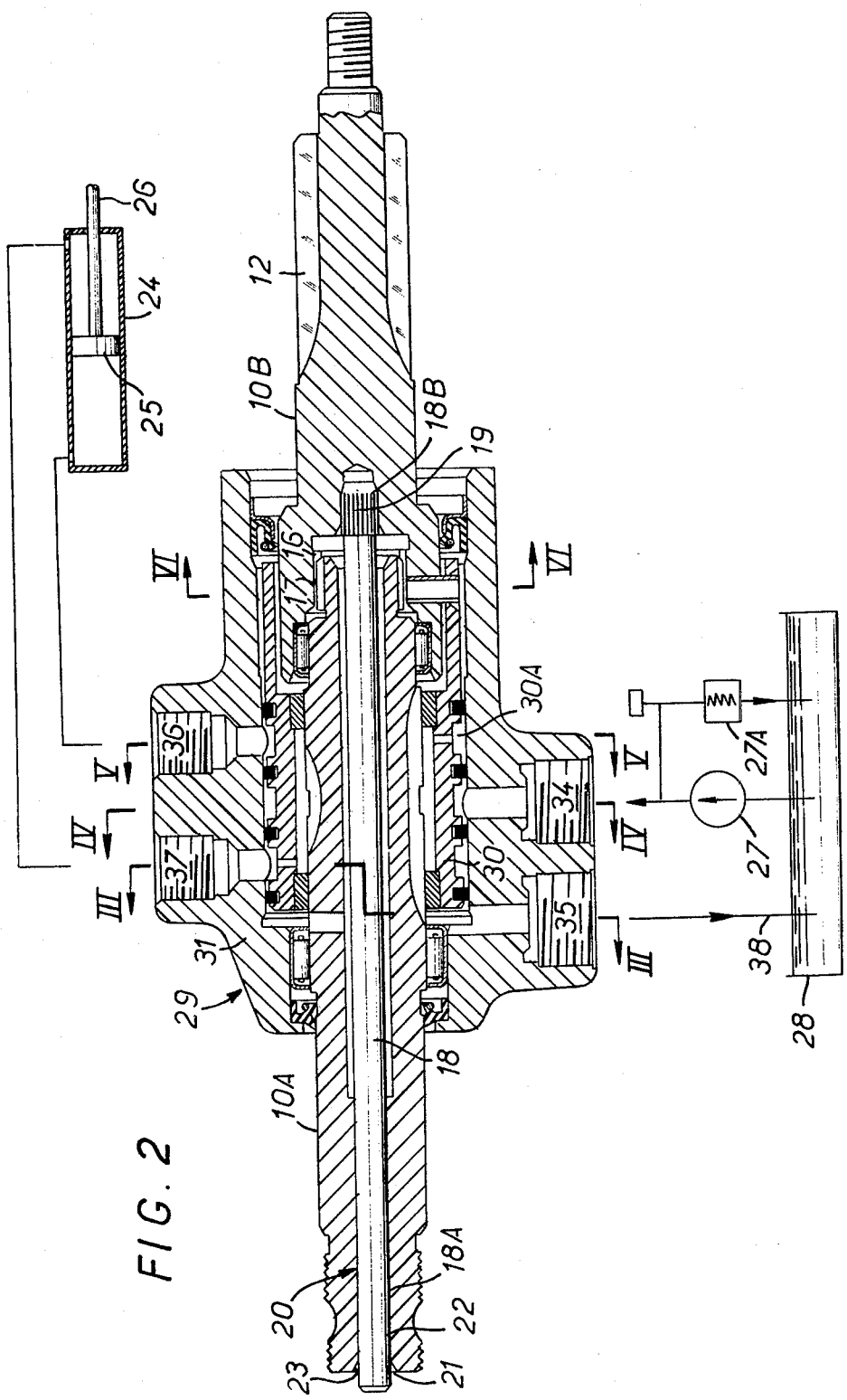
FIG. 2 is a view in cross-section of the mounting of the torsion bar on the two parts of the column and shows a hydraulic distribution means.

The parts 10A and 10B (FIG. 2) are relatively angularly movable between limits set by abutment means 16 and 17 (FIGS. 2, 6 and 7).

In the example illustrated these abutment means comprise a tip 17 of the part 10A, which tip has two oppositely situated flats and is engaged in a socket 16 in the part 10B in such a manner that the angular movability of the parts 10A and 10B is limited by means which provide a high degree of operational safety.

The total angular movability of the two parts 10A and 10B relative to one another is of the order of 6°, that is to say in practice 3° on each side of a middle position of rest. A torsion bar 18 connecting together the parts 10A and 10B urges them into this middle position of rest.

In normal operation the torsion bar 18 has in fact a movement under torsion of the order of 1° on each side of the position of rest. The torsion bar 18 returns the parts 10A and 10B to the middle position of rest and holds them in that position when the driver is not turning the steering wheel 11. Under these conditions the abutment means 16 and 17 do not intervene in normal operation but ensure safety in the event of a mechanical failure or an accident.

According to the invention the torsion bar has a very particular nature both as regards the manner in which it is fixed by its ends to the parts 10A and 10B, and as regards its actual shape.

The torsion bar 18 is cylindrical and has no heads. Its ends 18A and 18B are fastened respectively to the parts 10A and 10B. The end 18B is fastened to the part 10B in any relative angular position, suitably by a tight fit as shown at 19 in the example illustrated in FIG. 2.

This tight fit may be achieved through the action of smooth surfaces, that is to say without the interpenetration of material. However, it is advantageously achieved with interpenetration of material when one of the members has hard splines which form grooves in the other member, as shown in FIG. 2.

The end 18B may also be fastened to the part 10B, in any relative angular position, in various other manners. For example (FIG. 7), fastening is achieved by a wedge effect with the aid of balls 19' or a similar member, such as a cone. Fastening may also be effected for example by electric resistance welding as shown at 19" in FIG. 8, or by friction welding as shown at 19''' in FIG. 9, or by brazing or adhesive bonding.

The end 18A is fastened to the part 10A by bonding means 20, in a controlled angular position. This bonding means comprises brazing, welding, or adhesive bonding.

Assistance means are brought into action in response to an angular movement of the parts 10A and 10B in relation to one another, from the position of rest.

These assistance means comprise a hydraulic cylinder 24 whose piston 25 has a rod 26 acting on the rack 13 in the same direction as the pinion 12, so as to reinforce the action of the latter.

The assistance means comprise a central hydraulic system having a pump 27 with a discharge valve 27A taking fluid from a tank 28 and acting on the cylinder 24 through the medium of distribution means 29 sensitive to the relative angular position of the parts 10A and 10B.

The distribution means 29 may be in any suitable form. In the example shown in FIG. 2 it comprises a tubular sleeve 30 inserted between the part 10A and a body 31. Slots 32 and 33 are provided respectively in the parts 10A and 30. The body 31 has four apertures 34, 35, 36 and 37. The outer part of the sleeve 30 is shaped as a manifold 30A (FIG. 2), so that the consecutive slots 32 of the part 10A are alternately connected to the apertures 34 and 35. Similarly, the consecutive slots 33 of the sleeve 30 are alternately connected to the apertures 36 and 37.

The aperture 34 is fed by the pump 27. The aperture 35 is connected to a pipe 38 returning to the tank. The apertures 36 and 37 are connected respectively to the two sides of the cylinder 24.

Depending on the angular position of the parts 10A and 10B the slots 32 and 33, in the position of rest, make it possible for the apertures 34 and 35 to be brought into communication so that the installation functions with an open centre without acting on the power cylinder 24.

This position of rest is fixed when the distribution means 29 is installed, the end 18A being fastened to the part 10A by bonding means in a controlled angular position. This bonding means preferably consists of brazing effected in the following manner.

The end 18B of the torsion bar 18 is first connected in any angular position, for example by a tight fit at 19, in the part 10B. This having been done, the assembly comprising the parts 10A and 10B is placed vertically with the part 10B at the bottom and the part 10A at the top, and brazing filling material 23 is disposed in an entry 21 of a gap 20 formed between a bore 22 in the part 10A and the end 18A. The part 10A is turned relative to the part 10B so that these two parts are in a perfectly controlled relative angular position corresponding to a position of rest, that is to say a position in which no action is applied to the cylinder 24.

When the position of rest has thus been obtained in an accurate and easy manner, a high frequency induction head is engaged over the end of the part 10A containing the filling material 23. Through the action of the intense heating this material immediately flows into the entire gap 20, thereby fastening the end 18A to the part 10A by bonding.

It will be appreciated that this operation is effected under excellent conditions.

When the parts 10A and 10B are angularly offset in relation to one another, in a determined direction, the distributor 29 transmits the pressure of the pump 27 to the appropriate side of the cylinder 24 and connects the other side to the return to the tank 28. When the angular offsetting is reversed, the other side of the cylinder 24 will receive the pressure of the pump.

It will be appreciated that the torsion bar 18 has an extremely simple cylindrical shape without heads, thus permitting a reduced cost price and free selection of material and diameter. Fastening in a controlled position by brazing 22 ensures perfectly suitable fastening for the torque to be transmitted, which is of the order of 10 newton/meters.

Dimensions are thus reduced, thus making it possible to increase accordingly the section of the parts which serve an important safety function, particularly the parts 10A and 10B and the abutments 16 and 17, without increasing the overall diameter. Moreover, there is no weakening of the bar through transverse drilling.

Figure 10:
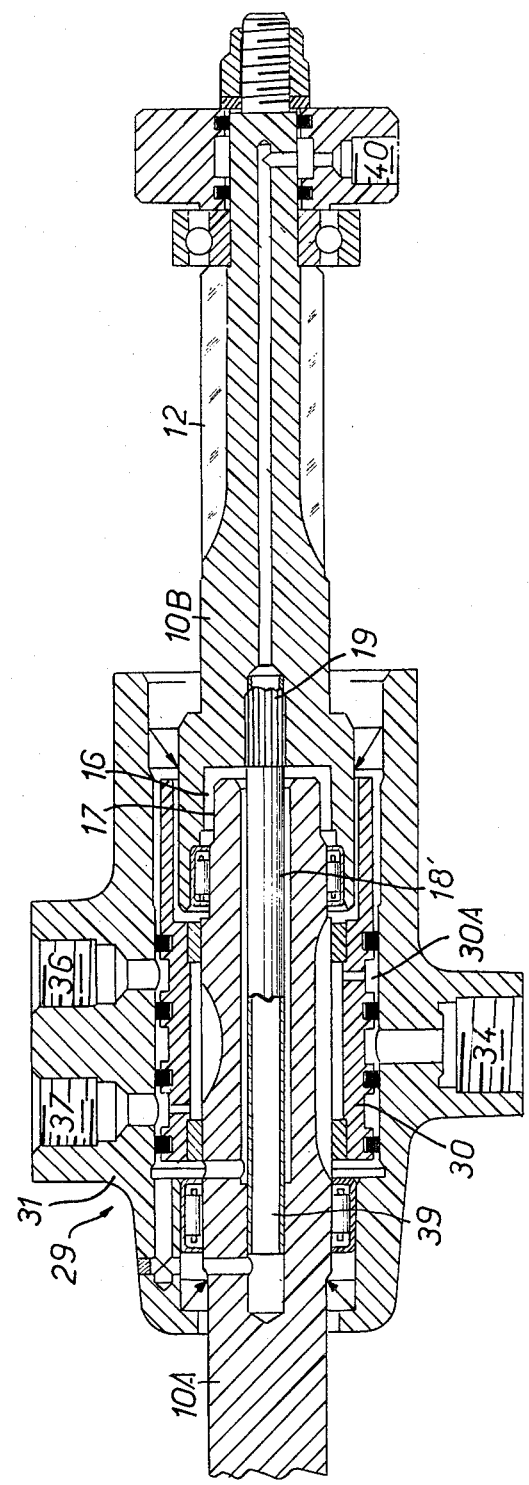
FIG. 10 is a view similar to FIG. 2 but relates to a modified embodiment.

The arrangement according to the invention makes it possible for the torsion bar 18 to be hollow, if so desired, and this arrangement is shown in FIG. 10, where the torsion bar designated 18' is hollow at 39.

This tubular shape of the bar 18' is advantageous from the point of view of strength of materials and is particularly effective when slight stiffness is desired. In addition, however, advantage may be taken of this tubular shape to enable the bar 18' to form a fluid circulation duct. A duct of this kind constitutes in particular a duct for return to the tank and is connected to an aperture 40 situated at the end of the part 10B. This makes it possible for the selection of the situation of the tank 28 to be modified at will.

I claim:

1. A power assisted steering device comprising a rotatable steering column consisting of two aligned parts fastened respectively to a steering control means and to a steering operating means, the said parts having a relative angular movability limited by abutment means and being connected to one another by a torsion bar, and assistance means operable in response to a relative movement of the said parts to act in the same direction as the steering operating means so as to assist the action thereof, characterised in that the said torsion bar is plain and cylindrical from end to end thereof and has a substantially uniform cross section along its length and has one of its ends fastened to one of the said parts in any relative angular position and the other of its ends fastened to the other said part by bonding means in a controlled angular position.

2. A device according to claim 1, characterised in that the bonding means comprises brazing applied between said torsion bar and a bore formed in the associated part of the column.

3. A device according to claim 1, characterised in that the fastening of said one end of the torsion bar to the associated part of the column in any relative angular position is effected by a tight interference fit.

4. A device according to claim 1, characterised in that the fastening of said one end of the torsion bar to the associated part of the column in any relative angular position is achieved by means of a wedge effect.

5. A device according to claim 1, characterised in that the fastening of said one end of the torsion bar to the associated part of the column in any relative angular position is effected by bonding.

6. A device according to claim 1, characterised in that the torsion bar is a hollow tube.

7. A device according to claim 6, characterised in that the tubular torsion bar forms a fluid circulation duct communicating with inlet and outlet conduits formed in the two parts of the column.

* * * * *